(12) United States Patent
Papafagos

(10) Patent No.: US 10,773,571 B2
(45) Date of Patent: Sep. 15, 2020

(54) SKYLIGHT FOR INSTALLATION IN A WALL OF A VEHICLE

(71) Applicant: Tectran Mfg. Inc., Cheektowaga, NY (US)

(72) Inventor: James C. Papafagos, North Java, NY (US)

(*) Notice: Subject to any disclaimer, the term of this patent is extended or adjusted under 35 U.S.C. 154(b) by 61 days.

(21) Appl. No.: 16/251,835

(22) Filed: Jan. 18, 2019

(65) Prior Publication Data

US 2019/0225056 A1 Jul. 25, 2019

Related U.S. Application Data

(60) Provisional application No. 62/620,162, filed on Jan. 22, 2018.

(51) Int. Cl.
*B60J 1/00* (2006.01)

(52) U.S. Cl.
CPC ............... *B60J 1/004* (2013.01); *B60J 1/008* (2013.01)

(58) Field of Classification Search
CPC ... B60J 1/008; B60J 1/005; B60J 1/004; B60J 10/70; B60J 1/10; B60J 1/085
USPC .......................................... 296/146.158, 201
See application file for complete search history.

(56) References Cited

U.S. PATENT DOCUMENTS

| | | | | |
|---|---|---|---|---|
| 1,364,459 A * | 1/1921 | Soss | ......................... | B60J 1/1815 296/145 |
| 3,156,415 A | 11/1964 | Walker | | |
| 3,482,366 A * | 12/1969 | Walker | .................... | B60H 1/262 52/214 |
| 3,776,591 A * | 12/1973 | Krueger | ...................... | B60J 1/08 296/146.15 |
| 5,150,943 A * | 9/1992 | Gold | .......................... | B60J 1/10 296/201 |
| 6,532,877 B1 * | 3/2003 | Hepburn | ................. | B61D 17/12 105/355 |
| 6,851,379 B2 * | 2/2005 | Black | ....................... | B63B 19/08 114/177 |
| 7,494,176 B1 * | 2/2009 | Duffy | ....................... | B60J 1/085 296/152 |

(Continued)

OTHER PUBLICATIONS

Truck-Lite Sky-Lite [Online]. Truck-Lite webpage [retrieved on Feb. 19, 2016]. Retrieved from the Internet: <URL: http://www.truck-lite.com/webapp/wcs/stores/sevlet/ProductDisplay?storeId=10001&productId=92503>.

(Continued)

*Primary Examiner* — Jason S Morrow
(74) *Attorney, Agent, or Firm* — Verrill Dana, LLP; John W. Powell

(57) ABSTRACT

A skylight assembly for installation in a vehicle wall includes a lens body having an exterior surface and a cap connected to an end of the lens body and a lens flange. There is a nut member to secure the lens body. A gasket is disposed between the lens member and the vehicle wall and includes a first leg portion and a second leg portion. The first leg portion extends into a recess between a surface of an aperture in the wall and the exterior surface of the lens body and the first leg portion has a uniform thickness which is less than a width of the recess thereby forming a gap. The second leg portion extends from the first leg portion substantially at a right angle and is disposed between and in contact along its length with the lens flange and the exterior of the wall about the aperture.

5 Claims, 4 Drawing Sheets

(56) References Cited

U.S. PATENT DOCUMENTS

| | | | |
|---|---|---|---|
| 7,878,574 B2 | 2/2011 | Thoma et al. | |
| 8,678,483 B2 * | 3/2014 | Quirk | B62D 25/10 |
| | | | 180/69.24 |
| 9,169,686 B1 * | 10/2015 | Podyma | E06B 1/26 |
| 2009/0189416 A1 * | 7/2009 | Thoma | B60J 1/10 |
| | | | 296/201 |
| 2015/0343885 A1 * | 12/2015 | Zmek | G02B 7/028 |
| | | | 296/146.15 |

OTHER PUBLICATIONS

Skylight Assembly Trailer Pack Product Details. Catalog [online]. Tectran Mfg. Inc. [retrieved on Feb. 19, 2016] Retrieved from the Internet: <URL: http://www.tectran.com/images/pdf/PB_skylight_web.pdf>.

* cited by examiner

SKYLIGHT FOR INSTALLATION IN A WALL OF A VEHICLE

CROSS-REFERENCE TO RELATED APPLICATIONS

This application claims the benefit of priority to U.S. Provisional Application No. 62/620,162, filed Jan. 22, 2018, which is incorporated herein by reference.

FIELD OF THE INVENTION

This invention relates to a skylight for installation in a wall of a vehicle, such as semi-tractor trailer truck or other type of vehicle and more specifically to such a skylight which is easy to install and sealed well to protect the interior of the vehicle from the elements.

BACKGROUND OF THE INVENTION

Installing one or more skylights in a wall of a trailer of a semi-tractor trailer truck may improve visibility in the interior of the trailer making it easier for the driver and others to navigate the interior of the trailer and to view, load, and unload the freight being carried. Installation may be done on an after-market basis by purchasing skylight assembly installation kits. Making installation easy while at the same time ensuring that the skylights are well sealed from the elements to prevent precipitation, among other things, from entering the trailer are important factors. The prior art solutions have not adequately addressed both of these factors and there is therefore a need for an improved skylight.

SUMMARY OF THE INVENTION

In one aspect the invention features a skylight assembly for installation in an aperture in the wall of a vehicle including a lens member including a lens body portion having an exterior surface and a cap portion connected to an end of the lens body portion and having a translucent interior region through which light may pass. The cap portion further including a lens flange surrounding the translucent interior region and extending beyond a perimeter of the lens body portion, the lens flange configured to mount on an exterior surface of the wall about the aperture. There is a nut member including a hollow nut body portion having an interior surface configured to receive the lens body portion and engage with the exterior surface of the lens body portion. The nut member further including a nut flange connected to an end of the hollow nut body portion and disposed about a perimeter of the hollow nut body portion, the nut flange portion configured to engage with an interior surface of the wall about the aperture. There is a gasket configured to be disposed between the lens member and the wall of the vehicle about the perimeter of the aperture, the gasket including a first leg portion and a second leg portion. The first leg portion extending into a recess formed between a surface of the aperture in the wall and the exterior surface of the lens body portion and the first leg portion having a uniform thickness which is less than a width of the recess, thereby forming a gap. The second leg portion extending from the first leg portion substantially at a right angle and being disposed between and in contact along its length with the lens flange and the exterior of the wall about the aperture.

In other aspects the invention may include one or more of the following features. The lens member, the nut member and the gasket may be circular in shape. The exterior surface of the lens body portion may include a plurality of threads and the interior surface of the hollow nut body portion may include a plurality of threads, which engage the plurality of threads on the exterior surface of the lens body portion when the lens body portion is inserted into the hollow nut body portion. The lens body portion may be hollow. The nut member may further include a lip disposed about the perimeter of the hollow body portion between the nut flange portion and the perimeter of the hollow body portion.

BRIEF DESCRIPTION OF THE FIGURES

Embodiments of the present disclosure will now be described, by way of example only, with reference to the attached Figures, wherein.

DETAILED DESCRIPTION OF THE INVENTION

Figure 1B:
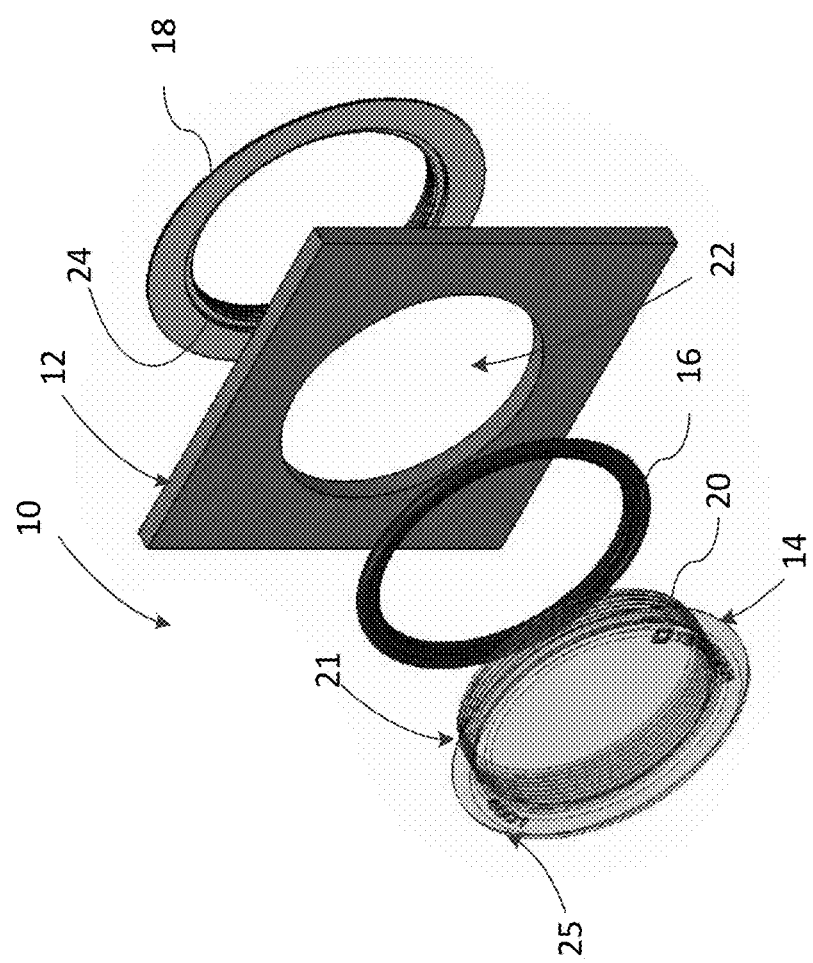
FIG. 1B shows an exploded view of the skylight shown in FIG. 1A.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein.

Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

Figure 1A:
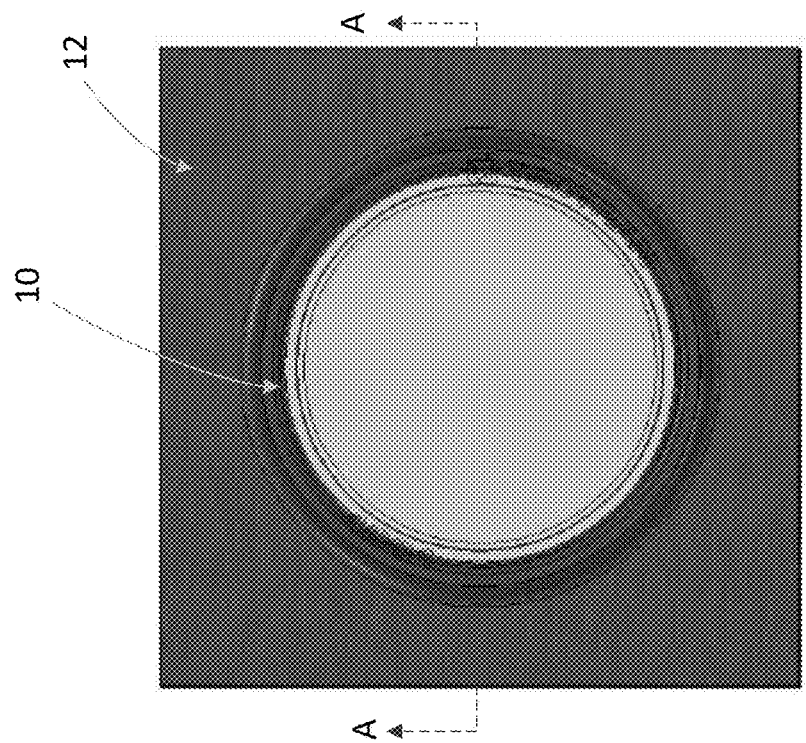
FIG. 1A shows a top plan view of a skylight according to an aspect of this invention.

Referring to FIG. 1A, there is shown a top plan view of a skylight 10, according to an aspect of this invention, installed in a section 12 of a trailer wall. The skylight 10 is depicted in FIG. 1B in an exploded perspective view to include skylight lens 14, skylight gasket 16, and skylight nut 18, all of which in this embodiment are circular in shape, but may be formed in different geometries. Skylight lens 14 contains threads 20 on the exterior of its cylindrical body portion 21, which cylindrical body portion 21 is installed through gasket 16 and aperture 22 in trailer wall 12. Skylight nut 18 is then affixed to cylindrical body portion 21 of skylight lens 14 by engaging threads 24 of skylight nut with threads 20 cylindrical body portion 21. Once skylight lens 14 is threaded into the skylight nut 18 with skylight gasket 16 properly seated within aperture 22 in wall 12, gasket 16 seals the exterior of the cylindrical body portion 21 of the skylight lens 14 against the wall of aperture 22. Skylight gasket 16 also seals the underside of flange or lip 25 of the skylight lens 14 against surface of trailer wall 12 about the perimeter of aperture 22. The seals achieved with skylight gasket are better depicted in FIGS. 3 and 4, which are described below.

Figure 2A:
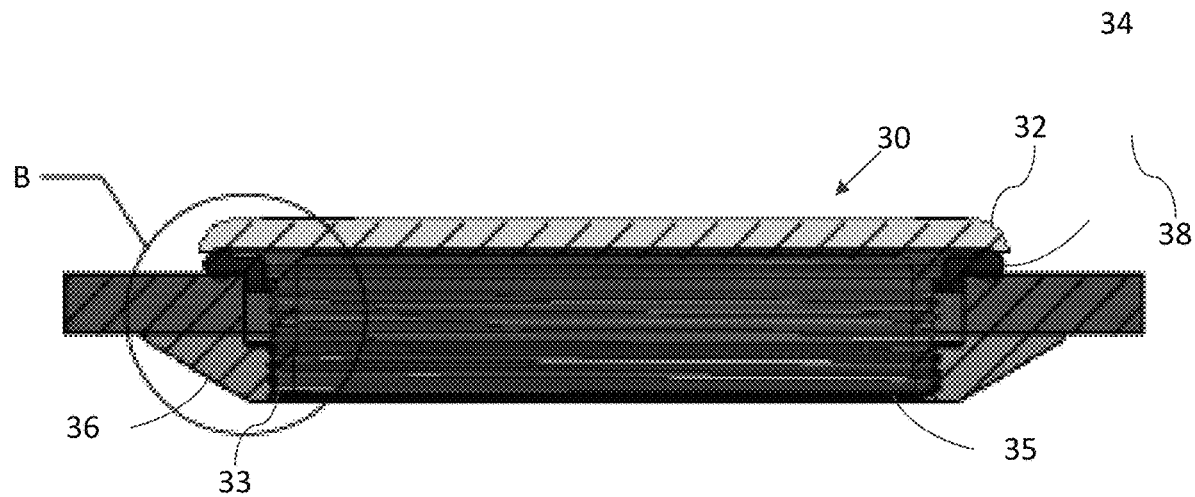
FIG. 2A shows a cross-sectional view similar to that shown in FIG. 3A of a prior art skylight.
Figure 2B:
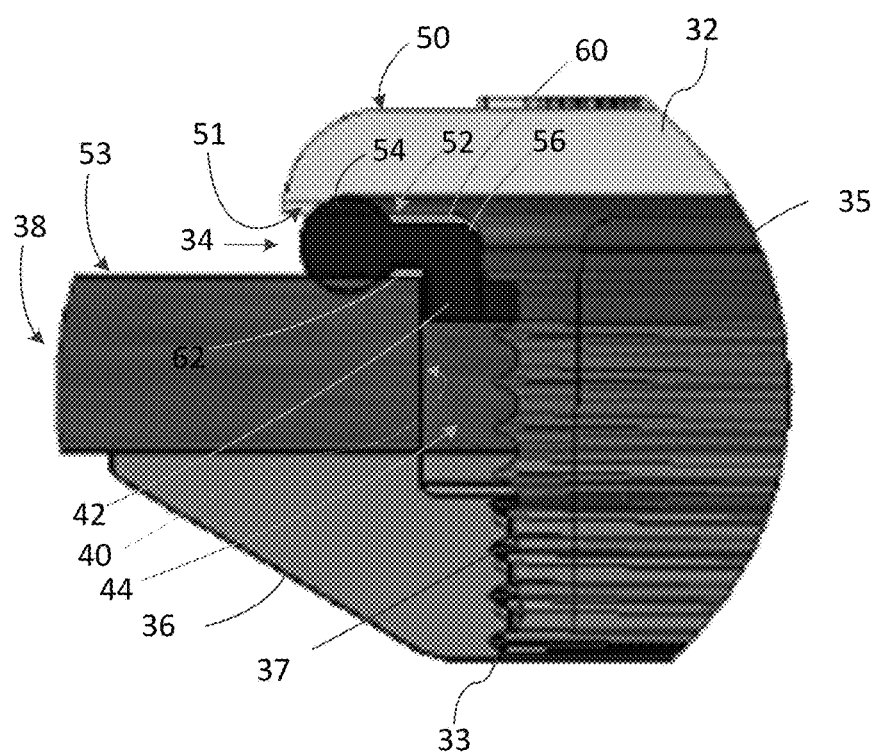
FIG. 2B an enlarged portion of FIG. 2A encompassed by the circle designated as B.

Before describing the skylight 10 in more detail, a prior art skylight design, shown in FIGS. 2A and 2B, is described in order to provide an understanding of the shortcomings of this design. This will allow for a better understanding of the structural differences between the prior art design and the current design, as well as the benefits. Prior art skylight 30 is shown in FIG. 2A to include skylight lens 32, skylight gasket 34, and skylight nut 36, which are arranged in a configuration similar to that of skylight 10 when they are installed into section 38 of a trailer wall.

Referring to FIG. 2B, as with skylight 10, prior art skylight 30 is installed by inserting skylight lens 32, with threads 33 on the exterior of its cylindrical body portion 35, which cylindrical body portion 35 is installed through gasket 34 and an aperture in trailer wall 38. Skylight nut 36 is then affixed to cylindrical body portion 35 of skylight lens 14 by engaging threads 37 of skylight nut 36 with threads 33 cylindrical body portion 35. Once skylight lens 32 is threaded into the skylight nut 36 and skylight nut 36 is secured firmly against the interior surface of trailer wall 38, skylight gasket 34 seals the skylight lens 32 against trailer wall 38.

While first leg portion 42 of skylight gasket 34 extends into and occupies much of the width of annular recess 44 formed between the threads 33 of the cylindrical body portion 35 of the skylight lens 32 and wall 40 of the aperture in the trailer wall 38 it does not provide a tight seal. First leg portion 42 is primarily used to assist the installer of skylight 30 when trying to align skylight lens 32 and install it into the aperture. First leg portion 42 is used to allow the installer to "feel" when alignment with the aperture and annular recess 44 has been achieved. Once skylight lens 32 has been aligned it may be inserted fully into the aperture. When this occurs and skylight nut 36 is secured firmly in skylight lens 32, skylight gasket 34 seals the underside 51 of flange or lip portion 50 of the skylight lens 32 with gasket base portion 52.

Flange or lip portion 50 extends radially outwardly beyond the cylindrical body portion 35 over surface 53 of trailer wall 38 about the perimeter of the aperture. Gasket base portion 52 comprises cylindrical member 54 having a diameter slightly greater than the space between the underside 51 of flange or lip portion 50 of the skylight lens 32 and surface 53 of trailer wall 38, so that it compresses and provides a tight seal. Gasket base portion 52 also includes a second leg member 56 connecting at one end to the cylindrical member 54 and at the other end at a right angle to first leg portion 42. The thickness of second leg member 56 is less than the diameter of cylindrical member 54 thus leaving a gap 60 between the second leg member 56 and the underside 51 of flange or lip portion 50 and a gap 62 between the second leg member 56 and the surface 53 of trailer wall 38.

While skylight gasket 34 is very effective at providing a tight seal, it has been found that during installation it is not as effective as desired. When skylight 30 is being installed, gasket 32 is mounted on cylindrical body portion 35 of skylight lens 32 and together this is inserted through an aperture in trailer wall 38, which is slightly larger than the diameter of cylindrical body portion 35. As the installer adjusts the skylight lens 32 and gasket 34 to align it properly with the aperture for insertion, the first leg 42 of skylight gasket 32 must be inserted precisely into annular recess 40 formed between threads 33 and wall 40 in the aperture in trailer wall 38. During this installation process, due to gaps 60 and 62 between the second leg member 56 of skylight gasket 34, the second leg member 56 may be deflected toward the underside 51 of flange or lip portion 50 of skylight lens 32 when the first leg 42 and extension member 43 impact surface 53 of trailer wall 38, thus preventing the first leg 42 and extension member 43 from properly seating in the annular recess 44. This can result in a significant amount of effort and time by the installer to properly align the skylight lens 32/gasket 34 with the aperture in trailer wall 38 to complete the installation.

Figure 3A:
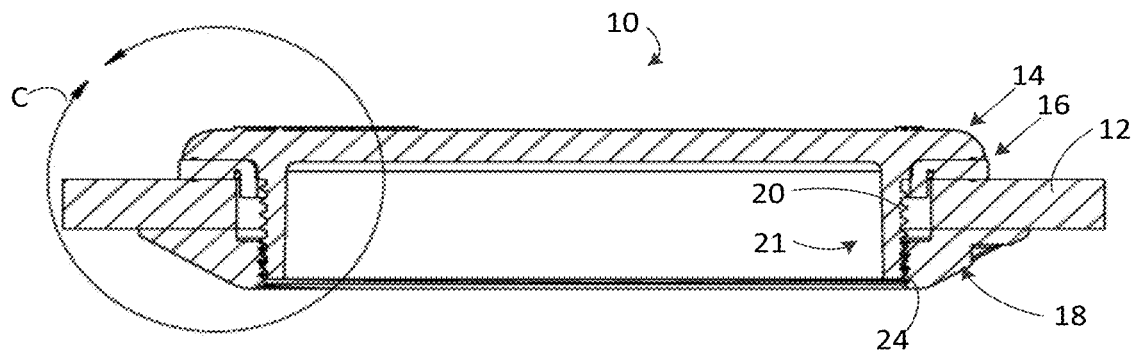
FIG. 3A shows a cross-sectional view of the skylight of FIG. 1A taken across line A-A installed within a relatively thick trailer wall.
Figure 3B:
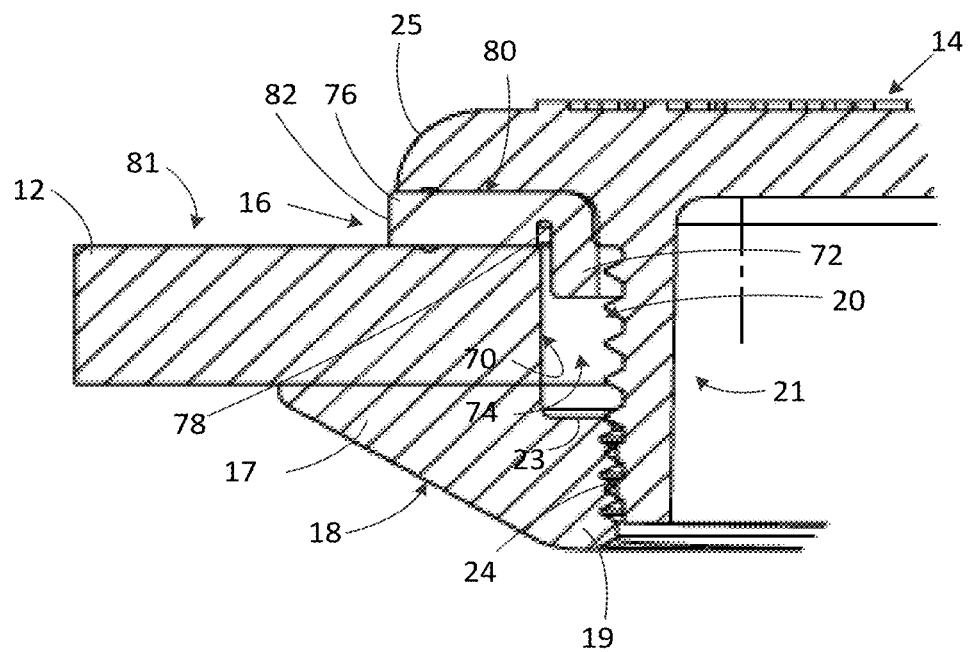
FIG. 3B an enlarged portion of FIG. 3A encompassed by the circle designated as C.

Referring now to FIGS. 3A and 3B for a more detailed description of skylight 10, according to an aspect of this invention, which provides an easier to install unit while at the same time providing the required sealing capabilities. In FIG. 3A, skylight 10 is shown installed in wall 12 with cylindrical body portion 21 of skylight lens 14 having been inserted through gasket 16 and placed through aperture 22 in trailer wall 38. Skylight nut 18 is affixed to cylindrical body portion 21 of skylight lens 14 by engaging threads 24 of skylight nut 18 with threads 20 of the cylindrical body portion 21. Skylight nut 18 includes nut flange 17, which engages with the interior surface of wall 12 and nut body 19, which is hollow and contains threads 24 on its inner surface. Once skylight lens 14 is threaded into the skylight nut 18, skylight gasket 18 seals skylight lens 14 against trailer wall 12.

First leg portion 72 of skylight gasket 16 extends into annular recess 74 to occupy a portion of the width of annular recess 74 between threads 20 and wall 70. Annular recess 74 is in part defined by a lip 23 disposed about the perimeter of the hollow nut body portion 19 and between it and the nut flange portion 17. As a result of first leg portion 72 only occupying a portion of the width of annular recess 74, it does not provide a tight seal. However, first leg portion 72 does assist in easier insertion of leg 72 into annular recess 74. First leg 72 and second leg 76 intersect at right angles and integrally form skylight gasket 16. At the right angle intersection of first leg 72 and second leg 76 there is formed a gap 78 which provides a level of compliance or movement of first leg 72 radially inwardly and outwardly with respect to the aperture, which may assist in the installation process described below.

Skylight gasket 16 seals the underside 80 of flange or lip portion 25 of the skylight lens 14 with second leg 76 of gasket 16. Flange or lip portion 25 extends radially outwardly beyond the cylindrical body portion 21 over surface 81 of trailer wall 12 about the perimeter of the aperture. Skylight gasket 16 does not include a cylindrical member such as cylindrical member 54, FIGS. 2A and 2B, but rather it has a second leg portion 76 having a uniform thickness from outer edge 82 of skylight gasket 16 to the intersection of second leg portion 76 and first leg portion 72. Thus, when the underside 80 of flange or lip portion 25 of the skylight lens 16 and surface 81 of trailer wall 12 are brought together during installation, second leg 76 of skylight gasket 16 compresses uniformly across its width and provides a tight seal with no gaps between it and underside 80 of flange or lip portion 25 and no gaps between it and surface 81.

With this design of skylight gasket 16 a very effective seal may be provided and it allows for an easier installation. When skylight 10 is being installed, gasket 16 is mounted on cylindrical body portion 21 of skylight lens 14 and together this is inserted through aperture 22 in trailer wall 12, which is slightly larger than the diameter of cylindrical body portion 21. As the installer adjusts the skylight lens 14 and gasket 16 to align it properly with the aperture for insertion, the first leg 72 remains fixed in place in the axial direction with respect to the aperture and is not deflected axially (i.e. in a direction parallel to the axis through the center of the aperture). This is not the case with the prior art which can be deflected axially and make it more challenging for the installer to align the skylight lens/gasket. As noted above, gap 78 provides a level of compliance or movement of first leg 72 radially inwardly and outwardly with respect to the aperture which may also help in the installation process to guide first leg 72 into the aperture and annular recess 74. These features improve the ease of installation, which results and shorter installation times and thus reduced cost. The cost savings are magnified when multiple skylights are installed in a given trailer.

Figure 4A:
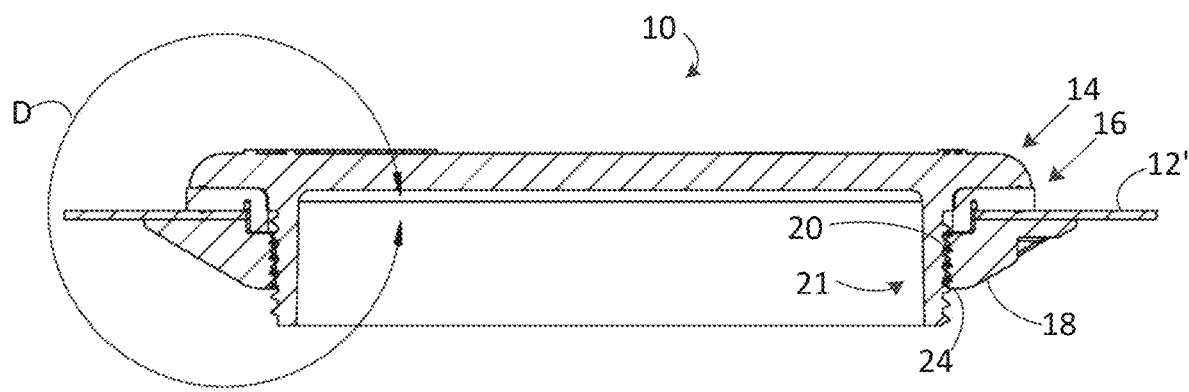
FIG. 4A shows a cross-sectional view of the skylight of FIG. 1A taken across line A-A installed within a relatively thin trailer wall.
Figure 4B:
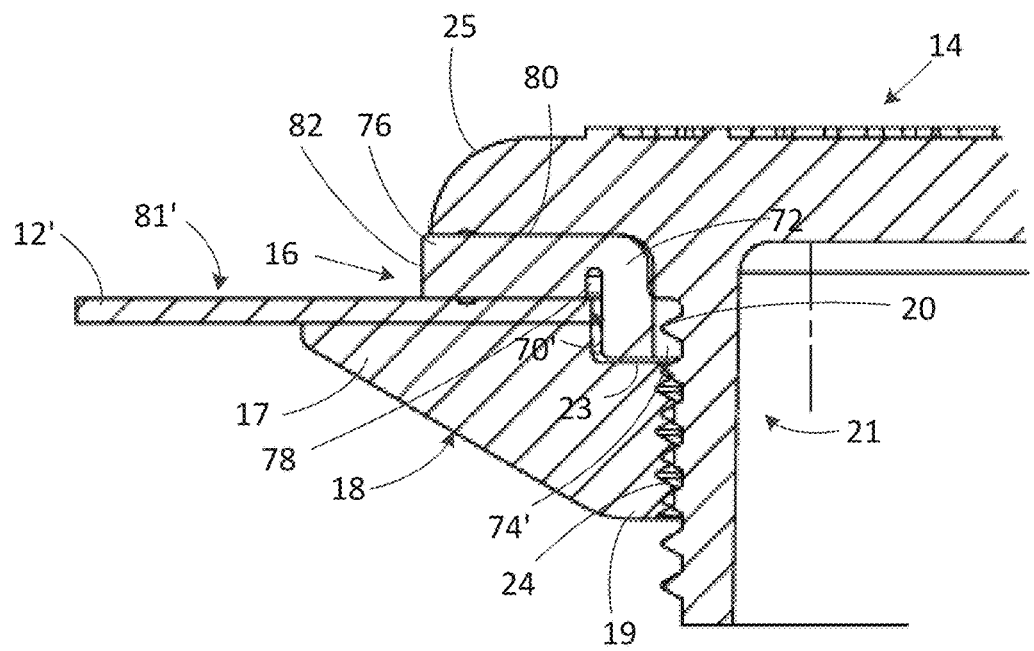
FIG. 4B an enlarged portion of FIG. 4A encompassed by the circle designated as D.

Referring to FIGS. 4A and 4B, the same skylight 10 is shown installed in the wall 12' of a trailer. Wall 12' is substantially thinner than wall 12 shown in FIGS. 3A and 3B. However, skylight 10, including skylight gasket 16, is designed to accommodate a range of wall thicknesses (e.g. from 0.047" in to 0.315" in.). In the case of the thinner wall 12', the depth of annular recess 74' is much less than the depth of recess 74 (FIGS. 3A and 3B) and as a result first leg 72 of skylight gasket 16 is not "floating" as in the case of a thicker wall (e.g. wall 12), but rather is touching or may even be compressed against the bottom of annular recess 74'. As with the installation shown in FIGS. 3A and 3B with a thicker trailer wall, the installation of the skylight 10 herein into a thinner wall is also made easier due to the design of the first leg 72 of gasket 16 into aperture and annular recess 74'.

While the foregoing description of the invention enables one of ordinary skill to make and use what is considered presently to be the best mode thereof, those of ordinary skill will understand and appreciate the existence of variations, combinations, and equivalents of the specific embodiments and examples herein.

The above-described embodiments of the present invention are intended to be examples only. Alterations, modifications and variations may be effected to the particular embodiments by those of skill in the art without departing from the scope of the invention, which is defined solely by the claims appended hereto.

The invention is therefore not limited by the above-described embodiments and examples, or embodiments and applications within the scope and spirit of the invention claimed as follows.

What is claimed is:

1. A skylight assembly for installation in an aperture in the wall of a vehicle, comprising:
    a lens member including a lens body portion having an exterior surface and a cap portion connected to an end of the lens body portion and having a translucent interior region through which light may pass, the cap portion further including a lens flange surrounding the translucent interior region and extending beyond a perimeter of the lens body portion, the lens flange configured to mount on an exterior surface of the wall about the aperture;
    a nut member including a hollow nut body portion having an interior surface configured to receive the lens body portion and engage with the exterior surface of the lens body portion, the nut member further including a nut flange connected to an end of the hollow nut body portion and disposed about a perimeter of the hollow nut body portion, the nut flange portion configured to engage with an interior surface of the wall about the aperture; and
    a gasket configured to be disposed between the lens member and the wall of the vehicle about the perimeter of the aperture, the gasket including a first leg portion and a second leg portion; the first leg portion extending into a recess formed between a surface of the aperture in the wall and the exterior surface of the lens body portion and the first leg portion having a uniform thickness which is less than a width of the recess thereby forming a gap; the second leg portion extending from the first leg portion substantially at a right angle and being disposed between and in contact along its length with the lens flange and the exterior of the wall about the aperture.

2. The skylight assembly of claim 1 wherein the lens member, the nut member and the gasket are circular in shape.

3. The skylight assembly of claim 1 wherein the exterior surface of the lens body portion includes a plurality of threads and the interior surface of the hollow nut body portion includes a plurality of threads, which engage the plurality of threads on the exterior surface of the lens body portion when the lens body portion is inserted into the hollow nut body portion.

4. The skylight assembly of claim 1 wherein the lens body portion is hollow.

5. The skylight assembly of claim 1 wherein the nut member further includes a lip disposed about the perimeter of the hollow body portion between the nut flange portion and the perimeter of the hollow body portion.

* * * * *